United States Patent [19]

Minemura et al.

[11] Patent Number: 4,706,300
[45] Date of Patent: Nov. 10, 1987

[54] OPTICAL HETERODYNE DETECTION PULSE RECEIVING SYSTEM AND METHOD

[75] Inventors: Kouichi Minemura; Minoru Shikada; Katsumi Emura, all of Tokyo, Japan

[73] Assignee: NEC Corporation, Tokyo, Japan

[21] Appl. No.: 575,595

[22] Filed: Jan. 31, 1984

[30] Foreign Application Priority Data

Jan. 31, 1983 [JP] Japan ............................ 58-14201

[51] Int. Cl.$^4$ ............................................. H04B 9/00
[52] U.S. Cl. ................................... 455/619; 455/608
[58] Field of Search ................ 455/608, 609, 619; 375/97, 110, 118, 119, 120; 356/349, 350

[56] References Cited

U.S. PATENT DOCUMENTS

| 3,426,207 | 2/1969 | Fried et al. | 455/619 |
| 3,530,298 | 9/1970 | Hubbard et al. | 455/619 |
| 3,939,341 | 2/1976 | Graves | 455/619 |
| 3,975,628 | 8/1976 | Graves et al. | 455/619 |
| 4,283,792 | 8/1981 | Hongu et al. | 455/258 |

OTHER PUBLICATIONS

"S/N ad Error Rate Evaluation for an Optical FSK-Heterodyne Detection System Using Semiconductor Lasers", Saito et al, *IEEE Journal of Quantum Electronics*, vol. QE-19, No. 2, Feb. 1983.

Hodgkinson et al, "Experimental Assessment of a 140 Mbit/s Coherent Optical Receiver at 1.52 $\mu$m", *Electronics Letters*, vol. 18, No. 12, Jun. 10, 1982.

*Primary Examiner*—Joseph A. Orsino, Jr.
*Attorney, Agent, or Firm*—Sughrue, Mion, Zinn, Macpeak & Seas

[57] ABSTRACT

An optical heterodyne detection pulse receiving system operates such that the light from a local oscillator and from a pulse modulated optical carrier are mixed, and a signal having an intermediate (difference) frequency is extracted. Pulse signal regeneration is effected by demodulating the intermediate frequency signal while maintaining a positive integer multiple of one-half the intermediate frequency signal synchronized with the repeating frequency of the pulse signal.

12 Claims, 6 Drawing Figures

OPTICAL HETERODYNE DETECTION PULSE RECEIVING SYSTEM AND METHOD

BACKGROUND OF THE INVENTION

The present invention relates to a pulse receiving system and method for use in the receiver section of a pulse communication system, and more particularly to a pulse receiving system and method using heterodyne detection in an optical wave band or the like.

The optical heterodyne detection technique, by which optical signals are detected by a heterodyne procedure, gains the advantage of permitting substantial improvement in the optical receiver sensitivity over the direct optical detection technique. According to this optical heterodyne detection method, the signal light which is a modulated carrier having a high frequency of hundred IHz, and the local oscillator light having substantially the same frequency are mixed by an optical detector and converted into an electric al signal having an intermediate frequency in the VHF band or the microwave band, and then this signal is demodulated into the original electric al signal.

Previously, where the demodulated electric al signal was a pulse signal, the intermediate frequency had to be set sufficiently high, no less than 15 times as high as the repeating frequency of the pulse signal. There was the disadvantage that, unless the intermediate frequency was high enough, a waveform distortion would arise, with the amplitude, width and phase of the pulse differing from one pulse to another, resulting in a deterioration in the optical receiver sensitivity.

However, a high intermediate frequency would necessitate an intermediate frequency amplifier in the high frequency band. This would entail a greater cost and a higher level of thermal noise, requiring a high level local oscillator. If the level of the local oscillator light were low, the optical receiver sensitivity would deteriorate. Therefore, it is desirable to set the intermediate frequency at a low value without inviting pulse waveform distortion.

SUMMARY OF THE INVENTION

An object of the present invention, accordingly, is to provide an optical heterodyne detection pulse receiving method and system capable of setting the intermediate frequency at a low value, no more than one-third of what is used for the same purpose in the prior art, without inviting pulse waveform distortion.

According to the invention, there is provided an optical heterodyne detection pulse receiving method whereby a local oscillator light wave and an optical carrier, modulated with a pulse signal, are mixed; a signal having an intermediate frequency equal to the difference between the frequency of the local oscillator light wave and that of the optical carrier is extracted; and the pulse signal is regenerated by demodulating this intermediate frequency signal, characterized in that an integral multiple of the half cycle of the intermediate frequency is synchronized with the full cycle of the repeating frequency of the pulse signal.

In the optical heterodyne detection pulse receiving method according to the invention, the full cycle of the repeating frequency of the demodulated pulse signal is synchronized with an integral multiple of the half cycle of the intermediate frequency.

Where the optical carrier modulated with the pulse signal is a pulse amplitude-modulated optical carrier, if a single-wave rectifying envelope detector is used for demodulating an intermediate frequency signal to regenerate the pulse signal, N has to be a positive even number, but if a full wave rectifying detector is used for that purpose, N merely has to be a positive integer, either odd or even.

Where the optical carrier modulated with the pulse signal is a pulse phase-modulated optical carrier, again N only has to be a positive integer, either odd or even.

Therefore, even if the intermediate frequency is set as low as four to six times the repeating frequency of the demodulated pulse signal, there will be no waveform distortion, wherein the amplitude, width and phase of the demodulated pulse signal differ from one pulse to another, and consequently there will be no deterioration of optical receiver sensitivity. Since the pulse receiving method according to the invention permits the intermediate frequency to be set as low as about one-third to a quarter of what is used for the same purpose in the prior art, the receiver section can be less expensively constructed, and the local oscillator wave can be less powerful.

DETAILED DESCRIPTION OF THE PREFERRED EMBODIMENTS

Figure 1:
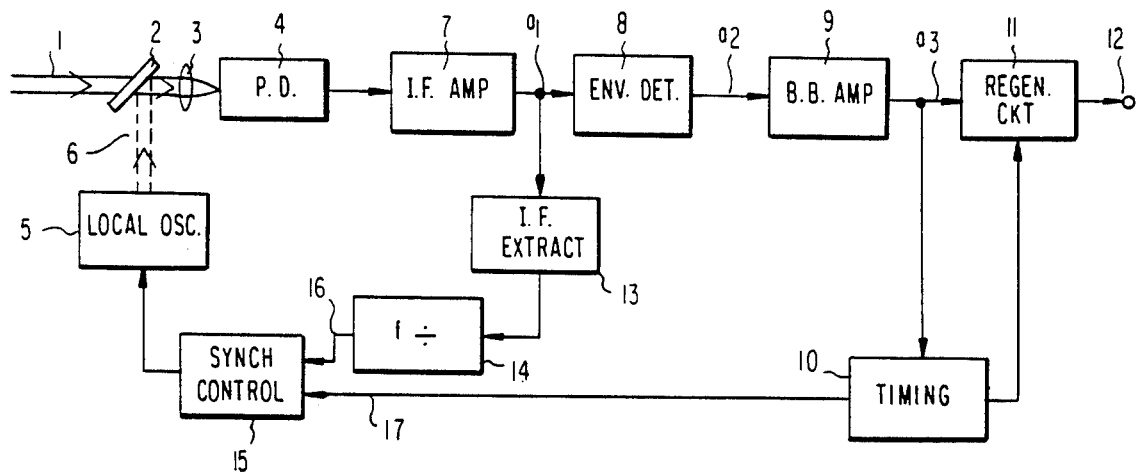
FIG. 1 is a block diagram illustrating a first preferred embodiment or the present invention.

Referring to FIG. 1, an embodiment of the present invention has a local oscillator light source 5, a half-mirror 2 for so multiplexing a local oscillator light beam 6 and a modulated arriving light beam 1 that their wave fronts coincide with each other, a germanium photodiode 4 for receiving the multiplexed light beam and converting it into an electric signal of an intermediate frequency, and a lens 3 for focusing the light beam on said photodiode. This embodiment further has an intermediate frequency amplifier 7, an intermediate frequency extractor 13, a frequency divider 14 and a synchronous controller 15, which, together with the local oscillator light source 5, the photodiode 4 and so on, constitute a phase locked loop. The output of the intermediate frequency amplifier 7 is supplied to an envelope detector 8, and the detected output is fed to a baseband amplifier 9 with a built-in lowpass filter. The output of the baseband amplifier 9 is supplied to a timing circuit 10, where a clock frequency component is extracted and a timing pulse is generated. With this timing pulse serving as the trigger, a regenerator circuit 11 regenerates the original signal from the output of the baseband amplifier 9. The timing pulse from the timing extraction circuit 10 is also fed to the local oscillator control circuit 15.

The optical carrier 1 of 230.77 THz in frequency (or 1.3 μm in wavelength), pulse amplitude-modulated at a bit rate of 32 Mb/s, passes the half-mirror 2, is focused by the lens 3 and enters the germanium photodiode (Ge-PD) 4, which is an optical detector. Meanwhile, from an InGaAsP semiconductor laser 5, which is the local oscillator light source, is supplied the local oscillator light wave 6, whose frequency is 128 MHz lower than that of the optical carrier 1, and this local oscillator light wave 6 is multiplexed with the optical carrier 1 by the half-mirror 2, the multiplexed light being focused by the lens 3 and entering the Ge-PD 4. The optical carrier 1 and the local oscillator light wave 6 are so adjusted at the light receiving surface of the Ge-PD 4 that their directions of polarization, wave fronts and so forth coincide with each other, and the Ge-PD 4 achieves mixing for optical heterodyne detection. From the Ge-PD 4 is supplied an intermediate frequency signal of 128 MHz, pulse amplitude-modulated at 32 Mb/s as a result of the mixing. This signal, after being amplified by the intermediate frequency amplifier 7, is envelope-detected by the envelope detector 8, and further undergoes amplification, band limitation and so forth by the baseband amplifier 9, from which is fed a signal to the timing circuit 10, where a sine wave of 32 MHz is extracted and on its basis is generated a timing pulse of 32 Mb/s. The 32 MHz sine wave is supplied to the local oscillator control circuit 15, while the 32 Mb/s timing pulse is fed to the regenerator circuit 11. The output signal of the amplifier 9 enters the regenerator circuit 11, is regenerated under synchronization by the timing pulse from the timing circuit 10, and is supplied to an output terminal.

The output signal of the intermediate frequency amplifier 7 is bisected, such that one part enters into the envelope detector 8, while the other is fed to the intermediate frequency extractor 13 to undergo the extraction of a 128 MHz intermediate frequency. The output of the intermediate frequency extractor 13, after being converted into a 32 MHz frequency by the ¼ frequency divider 14, becomes a first input signal 16 to the local oscillator control circuit 15, which compares the first input signal 16 and a second input signal 17 supplied from the timing circuit 10, and so controls the driving current of the InGaAsP semiconductor laser 5, which is the local oscillator light source, as to synchronize the two input signals. Thus, if the oscillating frequency of the InGaAsP semiconductor laser 5 is too low to keep the intermediate frequency no higher than 128 MHz and thus allows the frequency of the first input signal 16 to be higher than the 32 MHz frequency of the second input signal 17, the driving current of the InGaAsP semiconductor laser 5 is slightly reduced and its oscillating frequency raised. Or, conversely, if the oscillating frequency of the InGaAsP semiconductor laser 5 is too high, its driving current is slightly raised and its oscillating frequency lowered. By this control procedure, the intermediate frequency is synchronized with the second harmonic of the 32 MHz repeating frequency of the pulse signal. Thus, the third harmonic of the half cycle of the intermediate frequency is synchronized with the full cycle of the repeating frequency of the pulse signal.

Figure 2:
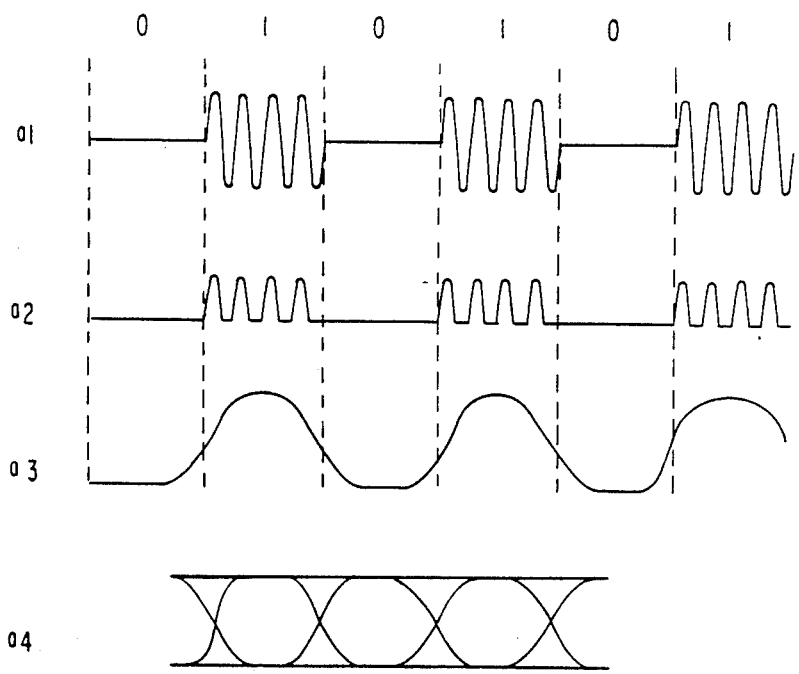
FIG. 2 is a timing chart referring to various sections of said first embodiment of the invention.

In FIG. 2, (a1) is the output waveform of the intermediate frequency amplifier 7; (a2), that of the envelope detector 8; (a3), that of the amplifier 9, and (a4), the eye pattern of the output of the amplifier 9. Since the 128 MHz intermediate frequency is in synchronism with the 32 MHz repeating frequency of the pulse signal, both the output waveform (a2) of the envelope detector 8 and that (a3) of the amplifier 9 are free from distortion. Accordingly, the eye pattern (a4) of the output of the amplifier 9 manifests a satisfactory waveform, almost completely free from jitter. Regeneration of the output of this amplifier 9, therefore, results in satisfactory pulse regeneration.

Figure 3:
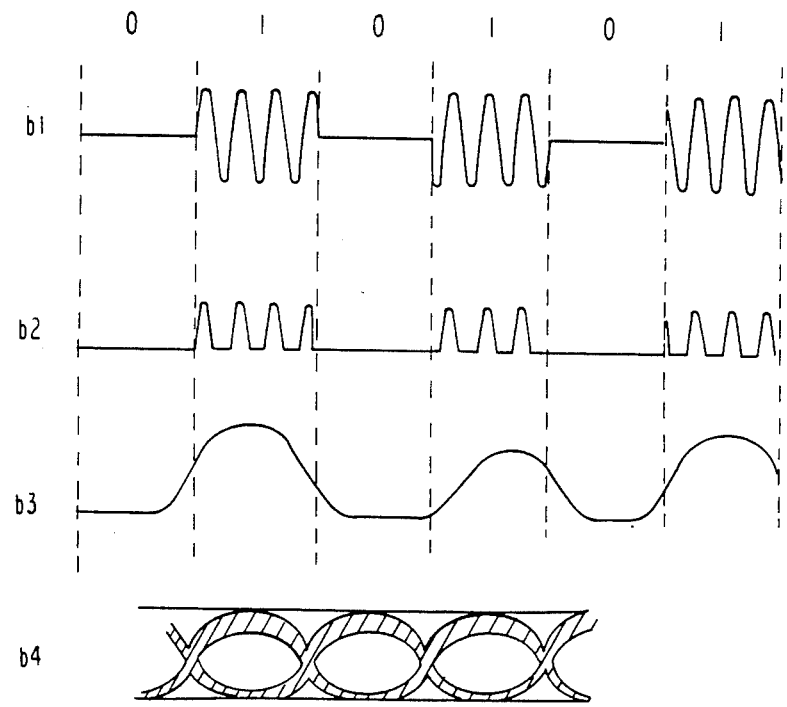
FIG. 3 is a timing chart of waveforms obtained where the present invention is not used.

To describe the advantage of the foregoing embodiment in further detail, cited below is an instance in which the intermediate frequency and the repeating frequency of the pulse signal are not synchronized with each other, i.e. the intermediate frequency extractor 13, the ¼ frequency divider 14 and the synchronous controller 15 of the foregoing embodiment are absent, with reference to FIG. 3, wherein the output waveforms b1, b2 and b3 of the intermediate frequency amplifier 7, the envelope detector 8 and the baseband amplifier 9, respectively, are shown, together with an eye pattern b4. In this case, although the repeating frequency of the pulse signal is 32 MHz as in the foregoing embodiment, the intermediate frequency is 107 MHz. Because an integral multiple of the full cycle of the intermediate frequency is not identical with the full cycle of the pulse signal, the phase of the input waveform (b1) of the intermediate frequency amplifier 7 differs from one pulse to another. As a result, there are distortions such that the output waveforms (b2) and (b3) of the envelope detector 8 and the amplifier 9, respectively, vary from pulse to pulse. Therefore, conspicuous jitter emerges in the eye pattern (b4) of the output of the amplifier 9. In this instance, compared with the foregoing embodiment, the optical receiver sensitivity deteriorates by at least 3 dB on account of jitter.

Now will be described the individual elements used in the preferred embodiment of the present invention.

A distributed feedback type buried heterostructure device can be used as the InGaAsP semiconductor laser, which is the local oscillator light source 5. This laser oscillates in a single axial mode and in a single lateral mode. Varying the driving current by 0.1 mA results in a variation in the oscillating frequency of about 100 MHz. Therefore, if the control signal deviates to 130 MHz from the desired intermediate frequency of 128 MHz, the driving current of this semiconductor will to be reduced by approximately 0.002 mA to adjust the intermediate frequency to 128 MHz.

Figure 4:
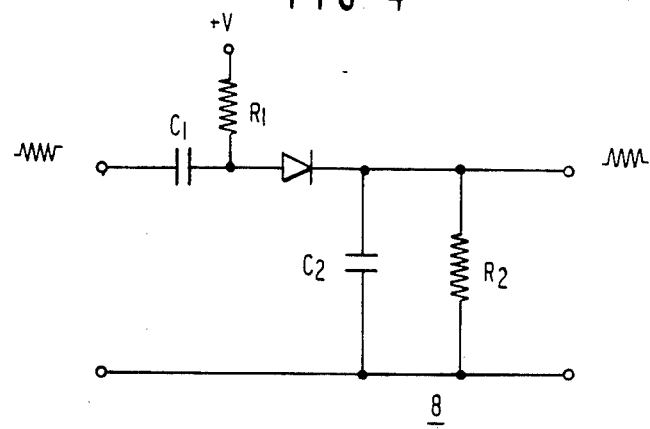
FIG. 4 is a circuit diagram of an envelope detector for use in the first embodiment of the invention.

The envelope detector circuit 8 is also well known in the art, and can consist, for instance, mainly of a diode and RC circuits as illustrated in FIG. 4. In this particular embodiment, $C_1$ is a pass condenser of 0.1 to 1 $\mu F$; $R_1$ is for bias supply, several $k\Omega$, and $C_2 R_2$ is selected at a time constant substantially equal to the period of the intermediate frequency, acceptable at $C_2 \simeq 10$ pF and $R_2 \simeq 800 \, \Omega$.

The timing circuit 10 and the regenerator circuit 11 are also well known in PCM technology or digital technology. In brief, the timing circuit 10 extracts a timing component from the output signal of the baseband amplifier 9, and generates a sine wave of 32 MHz and a timing pulse signal of 32 Mb/s, which is a pulsified product of the sine wave. For example, the band is narrowed using a monolithic crystal filter to remove noise, other than the linear spectrum, from the baseband signal and to thereby generate the sine wave, in which jitters are suppressed, and this sine wave is further supplied to a pulser to generate the timing pulse signal. The regenerator circuit 11 discriminates, according to the timing signal from the timing circuit 10, whether the output signal from the baseband amplifier 9 is "1" or "0", and regenerates it into a pulse signal.

The intermediate frequency extractor circuit 13 is utilized for extracting an intermediate frequency component from an intermediate frequency signal, amplitude-modulated at 32 Mb/s, and involves an intermediate frequency filter having a center frequency of 128 MHz. The sine wave of the intermediate frequency is generated herein, and converted into a pulse signal of this frequency.

The frequency divider 14 divides by ¼ the frequency of the pulse signal supplied from the intermediate frequency extractor circuit 13 to convert it into a sine singal, which is then supplied to the local oscillator control circuit 15.

The local oscillator control circuit 15, primarily comprising a phase comparator circuit, a lowpass filter and a level controller, adjusts as its output level the current of the driving circuit for the local oscillator light source 5. The phase comparator circuit compares the sine wave signal 17, corresponding to the bit rate of the pulse amplitude modulation, supplied from the timing circuit 10, and the phase of the sine wave, resulting from the ¼ frequency division of the intermediate frequency, supplied from the frequency divider 14, and generates an average D.C. voltage proportional to the difference between them. This voltage, after passing the lowpass filter, is fed to the driving circuit of the semiconductor laser for local oscillation through the level controller, resulting in the control of the driving current to vary the oscillation frequency. Therefore, the semiconductor laser 5, photodiode 4, intermediate frequency amplifier 7, intermediate frequency extractor 13, frequency divider 14, local oscillator control circuit 15, and the leads and light paths connecting them together constitute a phase locked loop.

Figure 5:
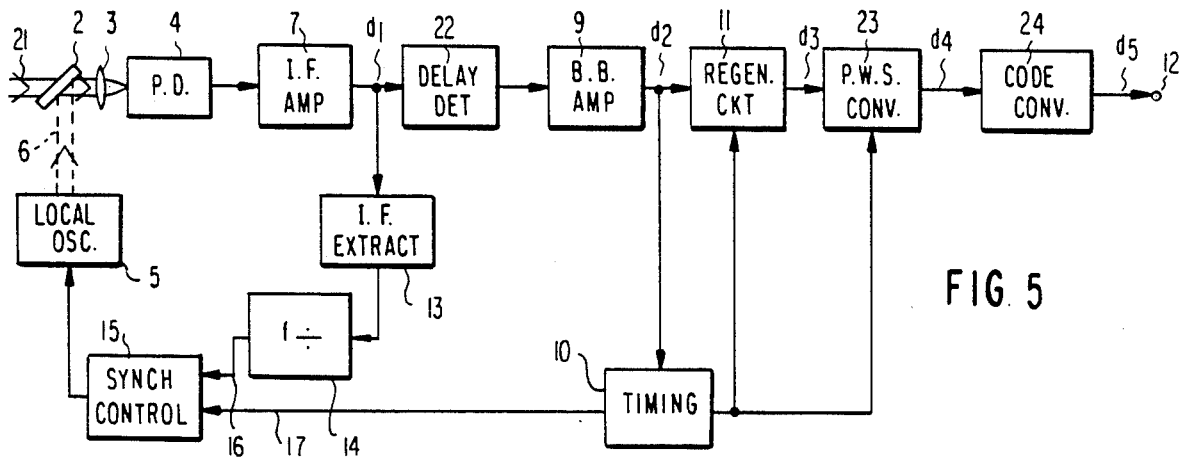
FIG. 5 is a block diagram illustrating a second preferred embodiment of the invention.
Figure 6:
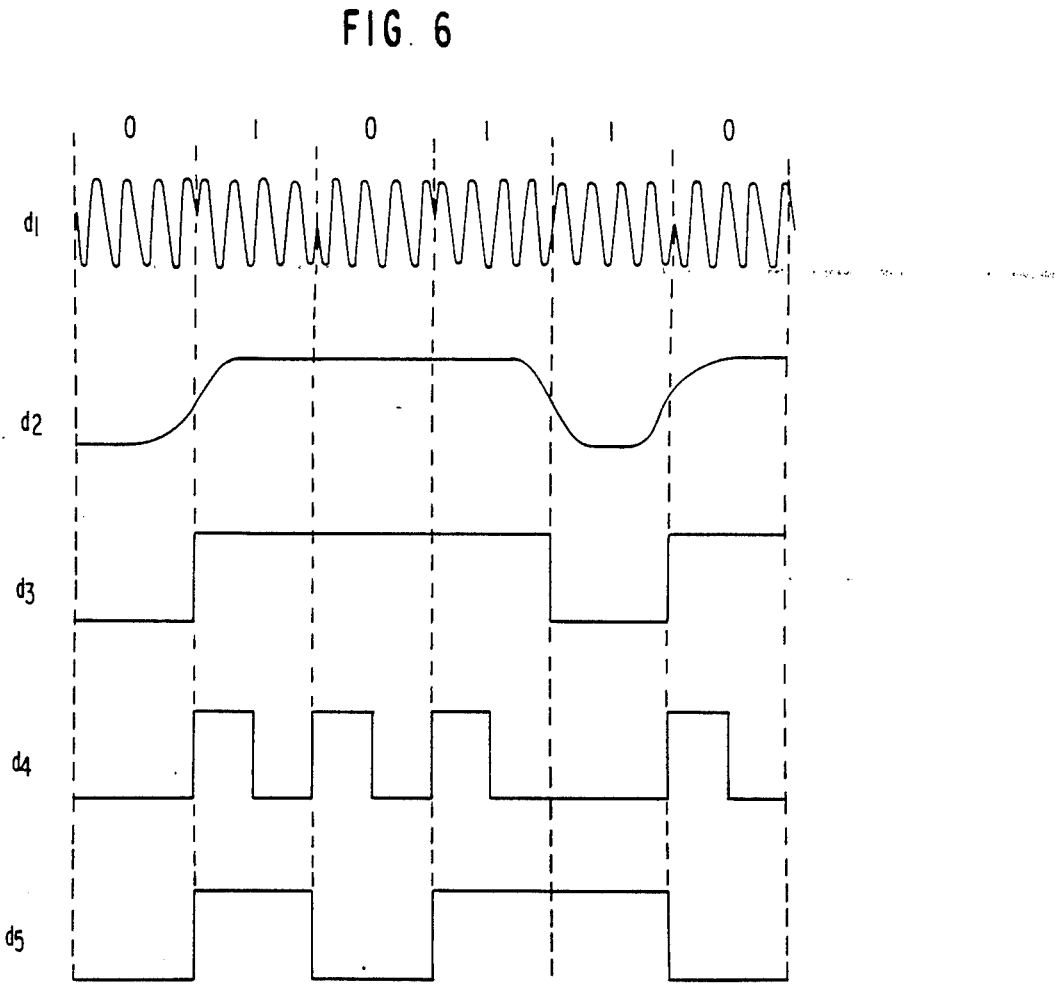
FIG. 6 is a timing chart referring to various sections of the second embodiment of the invention.

FIG. 5 is a block diagram illustrating the structure of a second preferred embodiment of the present invention, and FIG. 6 shows signal waveforms in various parts of this embodiment. An optical carrier of 230.77 THz in frequency (or 1.3 μm in wavelength), pulse phase-modulated with a pulse signal of 32 Mb/s in bit rate, passes a halfmirror 2, and is focused by a lens 3 to enter a Ge-PD 4. From an InGaAsP semiconductor laser 5 is supplied a local oscillator light wave 6, whose frequency is 128 MHz lower than that of the optical carrier 21, and the optical carrier 21 and the local oscillator light wave 6 are mixed and optically heterodyne-detected by the Ge-PD 4. From the Ge-PD 4 is supplied an intermediate frequency signal of 128 MHz, pulse phase-modulated at 32 Mb/s, and after this signal is amplified by an intermediate frequency amplifier 7, its output signal d1 is delay-detected by a delay detector 22 so as to be converted into a binary pulse signal of 32 Mb/s.

The delay detector 22, intended for converting binarily phase-modulated signals into binarily amplitude-modulated signals, is well known in the art as a phase modulation detector. To be more specific, it branches a binarily phase-modulated input signal into two signals, delays each branched signal with a delay circuit so as to be delayed by a single-bit equivalent (31.25 ns) and feeds the same to a double balanced mixer, which determines the difference between the two branched signals, and converts the binarily phase-modulated intermediate frequency signal into a binarily amplitude-modulated baseband signal. The output signal of the delay detector 22 further undergoes amplification, band limitation and the like by means of a baseband amplifier 9, which produces an output signal d2.

This output signal d2 of the amplifier 9 is supplied to a timing extractor 10, which extracts a timing signal of 32 MHz to generate a timing pulse of 32 Mbits, and supplies timing signals to a regenerator 11 and a pulse width share converter 23. The output signal of the amplifier 9 enters the regenerator 11, is synchronized by a timing signal of 32 Mbits and is regenerated as a regeneration signal d3. The output signal of the regenerator 11 enters the pulse width share converter 23, and is converted into a pulse signal of RZ code. The pulse width share converter circuit 23 determines the logical sum of the regeneration signal d3 from the regenerator circuit 11 and the timing pulse supplied from the timing extractor circuit 10, and punches the signal pulse with the timing pulse to convert the signal pulse into a pulse signal d4 of 50% duty ratio. A code converter 24 reverses the code of the output pulse at each leading edge of the input pulse to regenerate the original binary pulse signal d5, which is fed to an output terminal 12. The code converter 24 can consist of a flipflop. The composition and operation of all other sections of the second preferred embodiment are the same as the respectively corresponding sections of the first embodiment. Since the intermediate frequency of 128 MHz is synchronized with the repeating frequency of the pulse signal in this embodiment, as in the first, satisfactory waveforms which are almost completely free from distortion are obtained from the amplifier 9.

Although an intermediate frequency of 128 MHz and a pulse signal bit rate of 32 Mbits are used in both of the foregoing preferred embodiments, the two frequencies may be of different values as long as the multiple N (N may be any positive integer, though it is an even number in the first embodiment) of the half cycle of the intermediate frequency is synchronized with the full cycle of the pulse signal. Though a binary NRZ code is used for the pulse signal herein, other codes, such as a binary RZ code, code mark inversion (CMI) code, differential mark inversion (DMI) code, may be used or mBnB code. In the second embodiment, the pulse share converter 23 and the code converter 24, if contained in the light transmitter section and their effects therefore already included in the optical carrier 21, can be dispensed with. Instead of using the ¼ frequency divider 14 as in the two foregoing embodiments, a frequency quadrupler may be inserted between the timing extractor 10 and the local oscillator control circuit 15 and synchronization can be achieved at 128 MHz in the local oscillator control circuit 15.

What is claimed is:

1. An optical heterodyne detection pulse receiving method comprising the steps of:
   mixing an optical carrier modulated with a pulse signal and a local oscillator light wave having a frequency different from said carrier, and producing an electrical signal having an intermediate frequency equal to the difference between the frequency of said local oscillator light wave and that of said optical carrier;
   extracting the timing signal of said pulse signal from said electrical signal;
   generating a reproduction of said pulse signal by demodulating said electrical signal; and
   controlling the frequency of said local oscillator light wave so as to synchronize a first signal, derived from said electrical signal and having a period which is an integer multiple of the half period of said electrical signal, with a second signal derived from said timing signal and having a period equal to that of said pulse signal.

2. The optical heterodyne detection pulse receiving method, as claimed in claim 1, wherein said optical carrier modulated with a pulse signal is a pulse phase-modulated optical carrier.

3. The optical heterodyne detection pulse receiving method, as claimed in claim 1, wherein said optical carrier modulated with a pulse signal is a pulse amplitude-modulated optical carrier.

4. An optical heterodyne detection pulse receiving system comprising:
   an input laser light wave modulated with a pulse signal;
   local oscillator means for generating a local laser light wave having a frequency different from that of said input laser light wave;
   means for aligning wave fronts of the local laser light wave and said input laser light wave;
   means for receiving said local laser light wave and said input laser light wave, and for generating an electrical signal,
   timing means for extracting a timing signal of said pulse signal from said electrical signal;
   means for extracting from said electrical signal an intermediate frequency signal equivalent to the frequency difference between said local laser light wave and said input laser light wave; and
   means for controlling said local oscillator means so as to synchronize a first signal derived from said intermediate frequency signal and having a period of a multiple N (N being a positive integer) of the half period of said intermediate frequency signal with a second signal derived from said timing signal and having a period equal to that of said pulse signal.

5. The optical heterodyne detection pulse receiving system, as claimed in claim 4, wherein said modulated light wave is pulse amplitude-modulated with said pulse signal.

6. The optical heterodyne detection pulse receiving system, as claimed in claim 4, wherein said modulated light wave is pulse phase-modulated with said pulse signal.

7. The optical heterodyne detection pulse receiving system as claimed in claim 4, wherein said local laser light wave receiving, electrical signal generating means comprises a photoelectric conversion device.

8. The optical heterodyne detection pulse receiving system as claimed in claim 4, further comprising an intermediate frequency amplifier between said local laser light wave receiving, electrical signal generating means and said intermediate frequency signal extracting means.

9. The optical heterodyne detection pulse receiving system as claimed in claim 8, further including envelope detector means receiving an output of said intermediate frequency amplifier, and baseband amplifier means coupled between said envelope detector means and said timing means.

10. The optical heterodyne detection pulse receiving system as claimed in claim 9, further including original signal regenerating means receiving an output of said baseband amplifier and a synchronization timing pulse from said timing means.

11. The optical heterodyne detection pulse receiving system as claimed in claim 8, further including delay detector means receiving an output of said intermediate frequency amplifier, baseband amplifier means coupled between said delay detector means and said timing means, signal regenerator means receiving outputs of said timing means and said baseband amplifier means, pulse width share converter means coupled to an output of said signal regenerator means and receiving said timing means output, and code converter means coupled to an output of said pulse width share converter means.

12. The optical heterodyne detection pulse receiving system as claimed in claim 4, said controlling means varying a driving current supplied to said local oscillator means so as to vary an output frequency of said local oscillator means.

* * * * *

UNITED STATES PATENT AND TRADEMARK OFFICE
CERTIFICATE OF CORRECTION

PATENT NO. : 4,706,300
DATED : November 10, 1987
INVENTOR(S) : Kouichi Minemura et al It is certified that error appears in the above-identified patent and that said Letters Patent is hereby corrected as shown below:

Column 1, line 18, delete "IHz" and insert --THz--;
    line 20, delete "al";
    line 20, delete "electric and insert --electrical--;
    line 23, delete "electric al" and insert --electrical--;
    line 24, delete "electric al" and insert --electrical--.
Column 6, line 39, delete "may be used";
    line 40, after "code" insert --may be used--.

Signed and Sealed this

Second Day of August, 1988

Attest:

DONALD J. QUIGG

*Attesting Officer*    *Commissioner of Patents and Trademarks*